US011477705B2

(12) United States Patent
Basu Mallick et al.

(10) Patent No.: US 11,477,705 B2
(45) Date of Patent: Oct. 18, 2022

(54) RADIO LINK FAILURE RECOVERY

(71) Applicant: Lenovo (Singapore) PTE. LTD., New Tech Park (SG)

(72) Inventors: Prateek Basu Mallick, Dreieich (DE); Joachim Loehr, Wiesbaden (DE); Karthikeyan Ganesan, Kaiserslautern (DE); Vijay Nangia, Woodridge, IL (US); Hyejung Jung, Northbrook, IL (US); Ravi Kuchibhotla, Chicago, IL (US); Alexander Johann Maria Golitschek Edler von Elbwart, Darmstadt (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 57 days.

(21) Appl. No.: 16/886,402

(22) Filed: May 28, 2020

(65) Prior Publication Data

US 2021/0058833 A1   Feb. 25, 2021

Related U.S. Application Data

(60) Provisional application No. 62/889,993, filed on Aug. 21, 2019.

(51) Int. Cl.
*H04W 36/00* (2009.01)
*H04W 56/00* (2009.01)
(Continued)

(52) U.S. Cl.
CPC ......... *H04W 36/0055* (2013.01); *H04L 41/06* (2013.01); *H04L 41/5025* (2013.01); *H04W 56/003* (2013.01)

(58) Field of Classification Search
CPC .......... H04W 36/005; H04W 36/0055; H04W 36/305; H04W 28/0231; H04W 28/0236;
(Continued)

(56) References Cited

U.S. PATENT DOCUMENTS

2008/0076404 A1 * 3/2008 Jen ........................ H04W 76/19
455/423
2009/0285111 A1 * 11/2009 Ou ..................... H04W 72/1284
370/252

(Continued)

FOREIGN PATENT DOCUMENTS

| SE | WO-2021032605 A1 * | 2/2021 | ............ H04W 76/14 |
| WO | 2018135677 A1 | 7/2018 | |
| WO | 2020149640 A1 | 7/2020 | |

OTHER PUBLICATIONS

PCT/IB2020/000460, "Notification of Transmittal of the International Search Report and the Written Opinion of the International Searching Authority, or the Declaration", ISA, dated Oct. 1, 2020, pp. 1-13.

(Continued)

*Primary Examiner* — Warner Wong
(74) *Attorney, Agent, or Firm* — Kunzler Bean & Adamson (57) ABSTRACT

Apparatuses, methods, and systems are disclosed for radio link failure recovery. One method includes determining, at a first user equipment, an occurrence of a radio link failure with a second user equipment. The method includes transmitting information indicating the radio link failure. The method includes starting a timer in response to transmitting the information indicating the radio link failure. The method includes, after starting the timer and before the timer expires, transmitting one or more messages to the second user equipment requesting feedback from the second user equipment.

24 Claims, 6 Drawing Sheets

(51) Int. Cl.
*H04L 41/5025* (2022.01)
*H04L 41/06* (2022.01)

(58) Field of Classification Search
CPC ...... H04W 8/30; H04L 41/06; H04L 41/0654; H04L 41/5025; H04L 29/14; H04L 1/00; H04L 1/18; H04L 43/0823
See application file for complete search history.

(56) References Cited

U.S. PATENT DOCUMENTS

| | | | | |
|---|---|---|---|---|
| 2015/0085764 | A1* | 3/2015 | Xiong | H04W 76/38 370/329 |
| 2015/0099511 | A1* | 4/2015 | Lindoff | H04W 56/001 455/426.1 |
| 2015/0250011 | A1* | 9/2015 | Lindoff | H04W 76/14 370/225 |
| 2015/0365994 | A1* | 12/2015 | Yu | H04W 76/23 370/336 |
| 2016/0007252 | A1* | 1/2016 | Larmo | H04W 76/28 370/332 |
| 2016/0014646 | A1* | 1/2016 | Yiu | H04W 36/0079 370/331 |
| 2016/0323763 | A1* | 11/2016 | Xu | H04W 76/19 |
| 2017/0006524 | A1* | 1/2017 | Jung | H04W 76/14 |
| 2017/0048898 | A1* | 2/2017 | Jung | H04W 36/0088 |
| 2017/0055311 | A1* | 2/2017 | Van Phan | H04W 76/23 |
| 2018/0279140 | A1* | 9/2018 | Chandrane | H04W 24/04 |
| 2019/0081691 | A1* | 3/2019 | Nagaraja | H04B 17/309 |
| 2019/0320361 | A1* | 10/2019 | Uchiyama | H04W 36/03 |
| 2020/0029384 | A1* | 1/2020 | Hong | H04W 36/34 |
| 2020/0067762 | A1* | 2/2020 | Tang | H04W 36/305 |
| 2020/0236730 | A1* | 7/2020 | Shin | H04W 76/23 |
| 2020/0252990 | A1* | 8/2020 | Ganesan | H04W 76/19 |
| 2020/0383162 | A1* | 12/2020 | Cai | H04W 76/18 |
| 2021/0212148 | A1* | 7/2021 | Liang | H04L 5/0055 |
| 2022/0104035 | A1* | 3/2022 | Tenny | H04W 4/50 |

OTHER PUBLICATIONS

Apple, Discussion on SL RLM / RLF declaration, 3GPP TSG-RAN WG2 Meeting #106 R2-1906773, May 13-17, 2019, pp. 1-4.
Fujitsu, RLM/RLF for unicast in NR V2X, 3GPP TSG-RAN WG2 Meeting #107 R2-1909996, Aug. 26-30, 2019, pp. 1-3.
Samsung, Remaining Issues on SL RLM/RLF Declaration for NR V2X Unicast, 3GPP TSG-RAN WG2 Meeting #107 R2-1911329, Aug. 26-30, 2019, pp. 1-3.
SA2, Reply LS on mapping restriction for LCP procedure:, 3GPP TSG RAN WG2#107 R2-1908662, Aug. 26-30, 2019, pp. 1-2.
CATT, "RLM / RLF Procedure in NR V2X Sidelink", 3GPP TSG-RAN WG2 Meeting #107 R2-1908738, Aug. 26-30, 2019, pp. 1-6.
3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V1.1.0, Jul. 2019, pp. 1-50.

* cited by examiner

RADIO LINK FAILURE RECOVERY

CROSS-REFERENCE TO RELATED APPLICATIONS

This application claims priority to U.S. Patent Application Ser. No. 62/889,993 entitled "APPARATUSES, METHODS, AND SYSTEMS FOR AN RLF PROCEDURE IN NR V2X" and filed on Aug. 21, 2019 for Prateek Basu Mallick, which is incorporated herein by reference in its entirety.

FIELD

The subject matter disclosed herein relates generally to wireless communications and more particularly relates to radio link failure recovery.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Access Stratum ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure ("BF"), Beam Failure Detection ("BFD"), Beam Failure Recovery ("BFR"), Block Error Rate ("BLER"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Ratio ("CBR"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2—24.25 GHz to 52.6 GHz ("FR2"), Frequency Range 3—frequency between FR1 and FR2 ("FR3"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), In-Sync ("IS"), Intelligent Transport Systems-Application ID ("ITS-AID"), Layer 1 ("L1"), Layer 2 ("L2"), Layer 3 ("L3"), Licensed Assisted Access ("LAA"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NS SP"), Operation, Administration, and Maintenance System or Operation and Maintenance Center ("OAM"), Orthogonal Frequency Division Multiplexing ("OFDM"), Open-Loop ("OL"), Out-of-Sync ("OOS"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCP"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), PC5 Link Identifier ("PLI"), Public Land Mobile Network ("PLMN"), PC5 QoS Class Identifier ("PQI"), Physical Random Access Channel ("PRACH"), Physical Resource Block ("PRB"), Positioning Reference Signal ("PRS"), Physical Sidelink Control Channel ("PSCCH"), Primary Secondary Cell ("PSCell"), Physical Sidelink Feedback Control Channel ("PSFCH"), Provider Service Identifier ("PSID"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS") (e.g., RLM RS, DMRS, CSI-RS), Remaining Minimum System Information ("RMSI"), Radio Resource Control ("RRC"), Radio Resource Management ("RRM"), Resource Spread Multiple Access ("RSMA"), Reference Signal Received Power ("RSRP"), Reference Signal Received Quality ("RSRQ"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Adaptation Protocol ("SDAP"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL") (e.g., PC5 reference point), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE") (e.g., a V2X UE, V2X device), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL,"), Unicast Link Identifier ("ULI"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), Visiting NSSF ("vNSSF"), Visiting PLMN ("VPLMN"), Wide Area Network ("WAN"), and Worldwide Interoperability for Microwave Access ("WiMAX").

In certain wireless communications networks, RLFs may occur.

BRIEF SUMMARY

Methods for radio link failure recovery are disclosed. Apparatuses and systems also perform the functions of the methods. One embodiment of a method includes determining, at a first user equipment, an occurrence of a radio link failure with a second user equipment. In some embodiments, the method includes transmitting information indicating the radio link failure. In various embodiments, the method includes starting a timer in response to transmitting the information indicating the radio link failure. In certain embodiments, the method includes, after starting the timer and before the timer expires, transmitting one or more messages to the second user equipment requesting feedback from the second user equipment.

One apparatus for radio link failure recovery includes a first user equipment. In some embodiments, the apparatus includes a processor that determines an occurrence of a radio link failure with a second user equipment. In various embodiments, the apparatus includes a transmitter that transmits information indicating the radio link failure. In certain embodiments, the processor starts a timer in response to transmitting the information indicating the radio link failure. In some embodiments, the transmitter, after starting the timer and before the timer expires, transmits one or more messages to the second user equipment requesting feedback from the second user equipment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
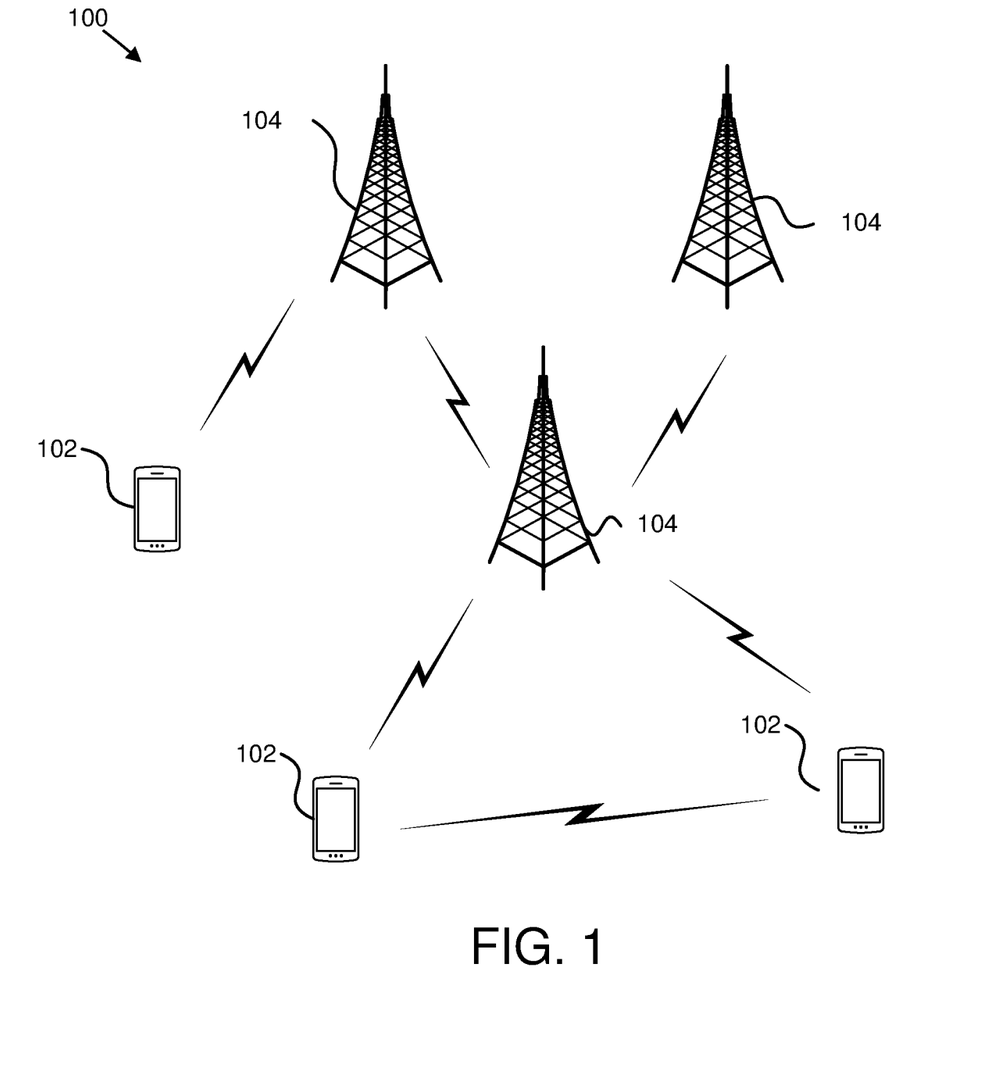
FIG. 1 is a schematic block diagram illustrating one embodiment of a wireless communication system for radio link failure recovery.

FIG. 1 depicts an embodiment of a wireless communication system 100 for radio link failure recovery. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine, at a first user equipment, an occurrence of a radio link failure with a second user equipment. In some embodiments, the remote unit 102 may transmit information indicating the radio link failure. In various embodiments, the remote unit 102 may start a timer in response to transmitting the information indicating the radio link failure. In certain embodiments, the remote unit 102 may, after starting the timer and before the timer expires, transmit one or more messages to the second user equipment requesting feedback from the second user equipment. Accordingly, the remote unit 102 may be used for radio link failure recovery.

Figure 2:
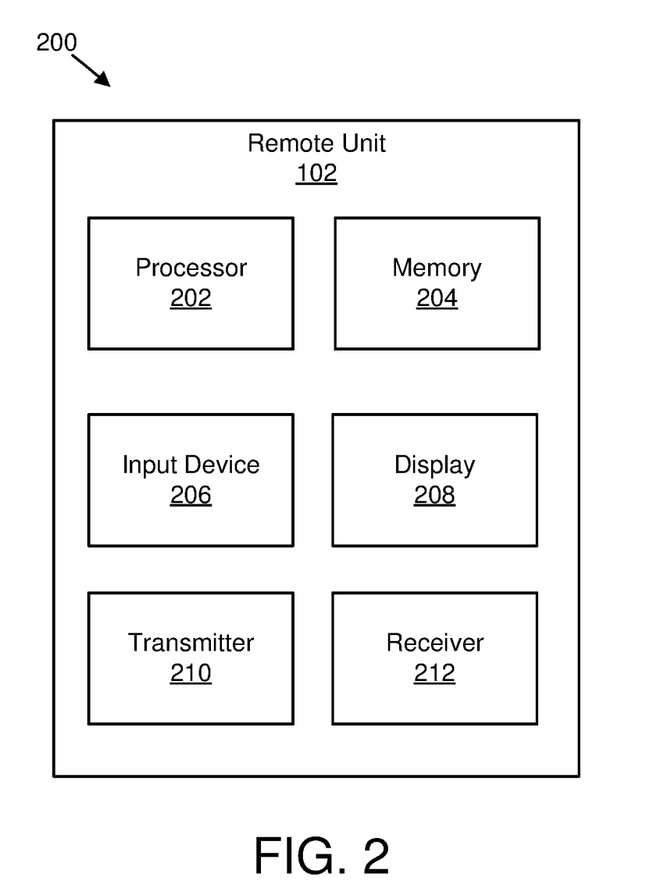
FIG. 2 is a schematic block diagram illustrating one embodiment of an apparatus that may be used for radio link failure recovery.

FIG. 2 depicts one embodiment of an apparatus 200 that may be used for radio link failure recovery. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In one embodiment, the processor 202 determines (e.g., at a first user equipment, first remote unit 102) an occurrence of a radio link failure with a second user equipment (e.g., second remote unit 102). In various embodiments, the transmitter 210 transmits information indicating the radio link failure. In certain embodiments, the processor 202 starts a timer in response to transmitting the information indicating the radio link failure. In some embodiments, the transmitter 210, after starting the timer and before the timer expires, transmits one or more messages to the second user equipment requesting feedback from the second user equipment.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
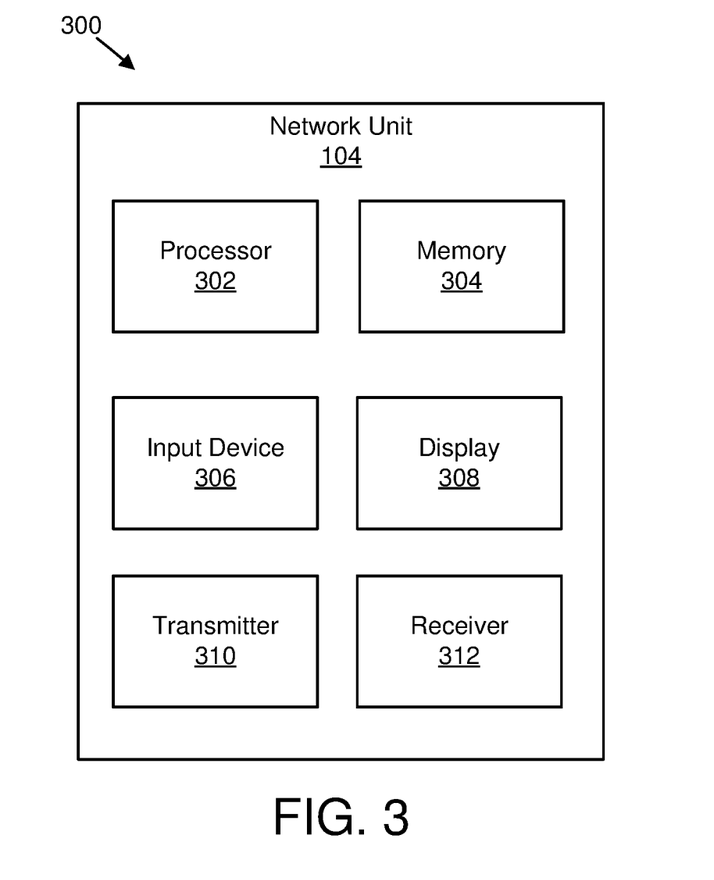
FIG. 3 is a schematic block diagram illustrating one embodiment of an apparatus that may be used for radio link failure recovery.

FIG. 3 depicts one embodiment of an apparatus 300 that may be used for radio link failure recovery. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, UEs in PC5 communication may monitor a radio link quality in a number of ways including: counting HARQ NACKs and/or RLC re-transmissions in one or both directions, counting CBRs above a certain threshold, and/or counting a number of OOS indications from a physical layer based on RLM RS measurements (e.g., RLF may happen in a sidelink communication if the metrics get worse such as by being beyond a threshold).

In some embodiments, one or more of the following may occur in response to a RLF: 1) stop timers that are running (e.g., the timers related to a SL RLF procedure); 2) discard a UE AS context for V2X SL; 3) discard security keys for V2X SL; 4) release all SL radio resources (e.g., including release of an RLC entity, a MAC configuration, and associated PDCP entity and SDAP for all established SLRBs); and/or 5) indicate the SL RLF to upper layers together with a cause.

In certain embodiments, a quick revival of a radio link may not be possible if a target UE ("T") reappears (e.g., within a coverage range of a source UE) and the source UE ("S") may be able to communicate again with the target UE (e.g., without needing to discover the target UE, establish a PC5-S connection with the UE, establish a PC5 RRC connection, and so forth). In various embodiments, UE behaviors may not enable revival of a radio link between a source UE and all target UEs. In some embodiments, revival of a radio link may be inefficient in a V2X situation in which vehicles keep appearing and disappearing due to: an obstruction (e.g., from a bigger transporter or from a construction site), a curvature of a road (e.g., blind turns, two UEs on two sides of a turn), an incline and/or decline of the road that may result in a lower antenna gain and/or an inability to meet antenna gain and scanning angle requirements (e.g., antenna panels are not sufficiently receiving signal) for communicating with another vehicle, short relative movement of a vehicle pair outside of a range of communication, and so forth. In certain embodiments, if a vehicular UE is communicating with an average of ten other UEs at any time and having an average of four active applications (e.g., with their own PC5 link identifier and/or L2 ID) with each of them, frequently performing release procedures and/or connection procedures (e.g., discovery procedures, establishing a PC5-S and/or PC5 RRC connection, a capability exchange, a configuration, and so forth) may use a large amount of processing and signaling overhead and/or may increase latency of a communication link.

In various embodiments, to a source UE it may not be apparent if various destination L2 IDs are in use at the same time (e.g. the source UE ("S") has data transmission to or reception from the same or different UEs). In such embodiments, each destination L2 ID may be seen as a destination UE by itself and there may be multiple L2 IDs belonging to the same target UE ("T"). Moreover, in such embodiments, the source UE may be running as many RLM and/or RLF procedures in parallel for the same physical target.

In some embodiments, after a RLF declaration, there may be quick recovery without first performing one or more of: discovery, establishing a PC5-S and/or a PC5 RRC connection, a capability exchange, a configuration, and so forth.

Figure 4:
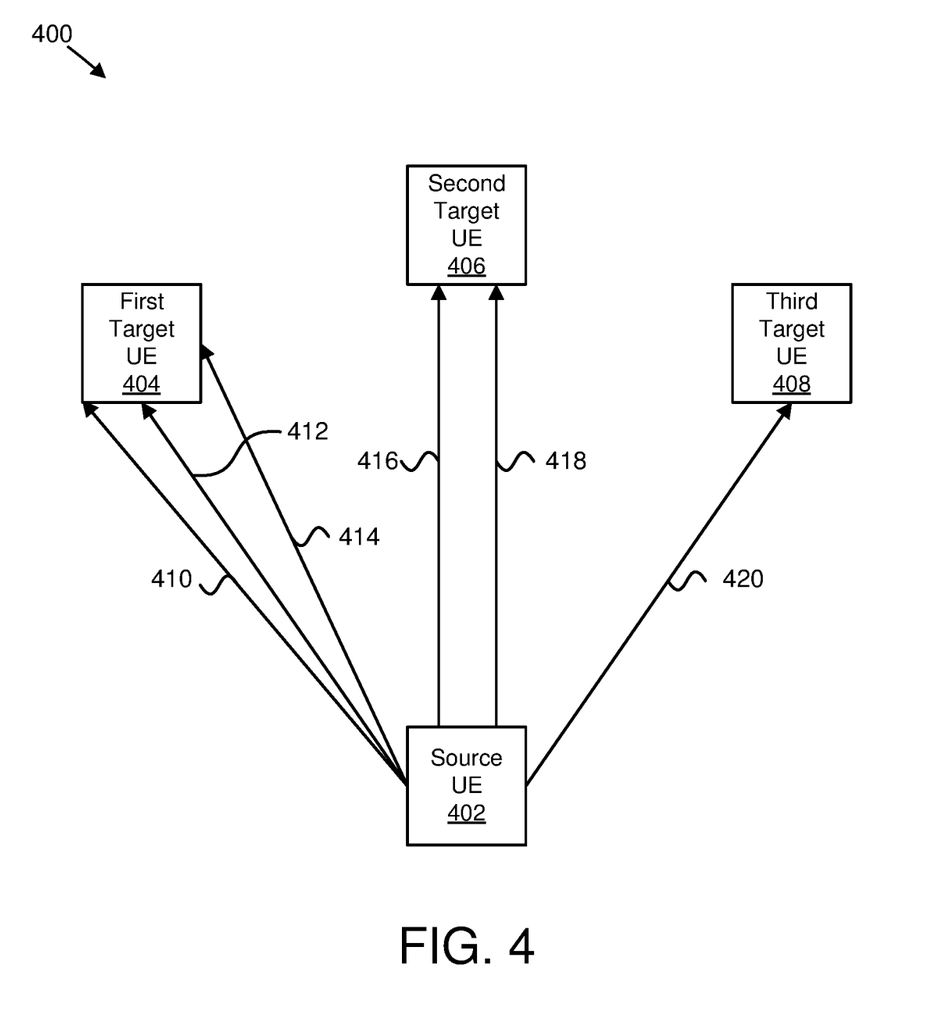
FIG. 4 is a diagram illustrating one embodiment of a system of UEs.

In certain embodiments, multiple logical channels (e.g., L2-ID pairs) belonging to a physical UE pair may be aggregated for RLM and/or RLF related procedures. In such embodiments, aggregation of multiple logical channels belonging to the physical UE pair may provide an AS level identifier between the UE pair. In some embodiments, a source UE ("S") may have transmissions with a number of other physical target UEs ("T") as described in FIG. 4. The roles source and target UEs may be interchangeable and may be defined with respect to a particular transmission. In various embodiments, a target UE may respond to a source UE. In such embodiments, the roles and names of the target UE and the source UE may be reversed (e.g., the source UE acts as the target UE). FIG. 4 shows the physical UE situation in which an L2 ID pair (e.g., source L2 ID and destination L2 ID) ends up in the same physical UE. As used herein, physical UE may mean a particular V2X device hardware that may have multiple V2X applications running with corresponding PC5 link identifiers and L2 source identifiers. In certain embodiments, each UE of a PC5 unicast link self-assigns its source layer 2 ID for the PC5 unicast link. In various embodiments, initial signaling for establishment of a PC5 unicast link may use a default destination layer-2 ID associated with a service type (e.g., PSID and/or ITS-AID) configured for PC5 unicast link establishment. In some embodiments, a destination layer 2 ID destined for SL unicast may be obtained from a peer UE during a PC5 unicast link establishment procedure (e.g., layer-2 link establishment over a PC5 reference point). In certain embodiments, a source layer 2 ID of a peer UE may be used as a destination layer 2 ID for signaling and data traffic for a PC5 unicast link. In various embodiments, PC5 unicast link layer-2 IDs may change during a life of a PC5 unicast link.

FIG. 4 is a diagram illustrating one embodiment of a system 400 of UEs. The system 400 includes a source UE 402, a first target UE 404, a second target UE 406, and a third target UE 408. The source UE 402 may use: a first destination layer 2 ID 410 (e.g., Dest-L2-ID1) to communicate with the first target UE 404, a second destination layer 2 ID 412 (e.g., Dest-L2-ID2) to communicate with the first target UE 404, a third destination layer 2 ID 414 (e.g., Dest-L2-ID3) to communicate with the first target UE 404, a fourth destination layer 2 ID 416 (e.g., Dest-L2-ID4) to communicate with the second target UE 406, a fifth destination layer 2 ID 418 (e.g., Dest-L2-ID5) to communicate with the second target UE 406, and a sixth destination layer 2 ID 420 (e.g., Dest-L2-ID6) to communicate with the third target UE 408.

In various embodiments, a V2X UE (S) may choose one RS sequence randomly among a set of available RS sequence, may be configured by a network with one RS sequence, or may be pre-configured with one RS sequence. In such embodiments, if the one RS sequence is selected from a set of available RS sequences, the set of available RS sequences may be configured by the network. Further, in such embodiments, the V2X UE (S) may transmit the RS sequence to a destination UE (e.g., the same RS sequence may be transmitted regardless of the destination L2 IDs). In one example, an RS sequence may be the same for all spatial transmit filters or beams. In another example, an RS sequence may be dependent on a spatial transmit filter or beam ID. In some embodiments, transmission of a chosen RS sequence happens in REs embedded in/around PSSCH and/or PSCCH resources for transmission to each destination. This may enable a receiver to associate all receptions (e.g., addressed to any of its source IDs) containing and/or embedding the same RS sequence to the same physical transmitter V2X UE (S). With respect to FIG. 4, this may mean that the first target UE 404 determines that Dest-L2-ID1, Dest-L2-ID2, and Dest-L2-ID3 all come from the same physical UE (e.g., the source UE 402) even if the source L2 ID contained in these transmission may be different.

In certain embodiments, transmission of a chosen RS sequence may be done in REs outside of PSSCH and/or PSCCH resources. In such embodiments, if a corresponding source physical UE ("S") is known to a receiver (e.g., the first target UE 404), then the chosen RS sequence may help in channel tracking and/or in various measurements. Moreover, in such embodiments, channel monitoring, estimation, and/or tracking may be done on a physical UE basis and may affect all L2 IDs (e.g., applications) together. In various embodiments, if a reception quality at a target UE (e.g., the first target UE 404) of RS transmitted by a source UE is below a threshold (e.g., threshold number of times) or is based on another metric, the target UE may indicate a RLF (e.g., with respect to the source UE).

In some embodiments, a V2X UE (e.g., source UE) may randomly chose a number (e.g., a 16 digit number) (e.g., called PC5-RNTI). In such embodiments, the PC5-RNTI may be derived from upper layer identities like L2 source ID, PLI, ULI, and/or may be preconfigured (e.g., configured). Further, in such embodiments, the V2X UE transmits the PC5-RNTI (e.g., RS sequence based on the PC5-RNTI) irrespective of the destination UE (e.g., transmits the same RS sequence regardless of destination L2 IDs) with all transmissions made toward any V2X destination. In one example, the RS sequence may be the same for all spatial transmit filters or beams. In another example, the RS sequence may be dependent on a spatial transmit filter or beam ID. This may enable a receiver to associate all reception data (e.g., addressed to any of its source IDs) containing and/or embedding the same PC5-RNTI with the same physical transmitter V2X UE. In various embodiments, actual transmission of PC5-RNTI may happen as part of a MAC PDU subheader, as an L1 identity (e.g., in PSCCH), and/or may be used for L1 CRC scrambling.

In certain embodiments, source specific RS as well as PC5 RNTI may be used together.

In some embodiments, a RLF may be declared on a per physical UE basis (e.g., the basis is established as described herein) and on a per L2 ID pair basis. In such embodiments, an AS, upon declaring a RLF (e.g., at a source UE ("S") based on RLM measurements from another UE's (e.g., target UE) RSs), may inform an upper layer (e.g., V2X layer or V2X application) directly or via a UE NAS. Further, in such embodiments, the upper layer may take a number of actions including, but not limited to, contacting other V2X target UEs and/or vehicles, sending a groupcast message targeting an action, slowing down a current source vehicle, and/or doing nothing. In various embodiments, informing upper layers may take place as soon as a RLF is declared (e.g., in response to OOS indications from a physical layer or upon expiration of a timer that starts in response to OOS indications). In such embodiments, immediately after the RLF is declared, the AS starts a timer. While the Timer is running, the source UE may attempt to recover the radio link with the target UE. To accomplish a radio link recovery, the source UE may periodically transmit messages to attempt communication with the target UE (e.g., "Are you there" messages and/or signals). In certain embodiments, the "Are you there" messages may include: data (e.g., retransmissions of not yet acknowledged data), PC5 RRC signaling checking if the target UE is around, physical layer signaling including SL RS, RLM RS, and/or DMRS sequence, and/or a PSCCH transmission checking to see if the target UE is around.

Figure 5:
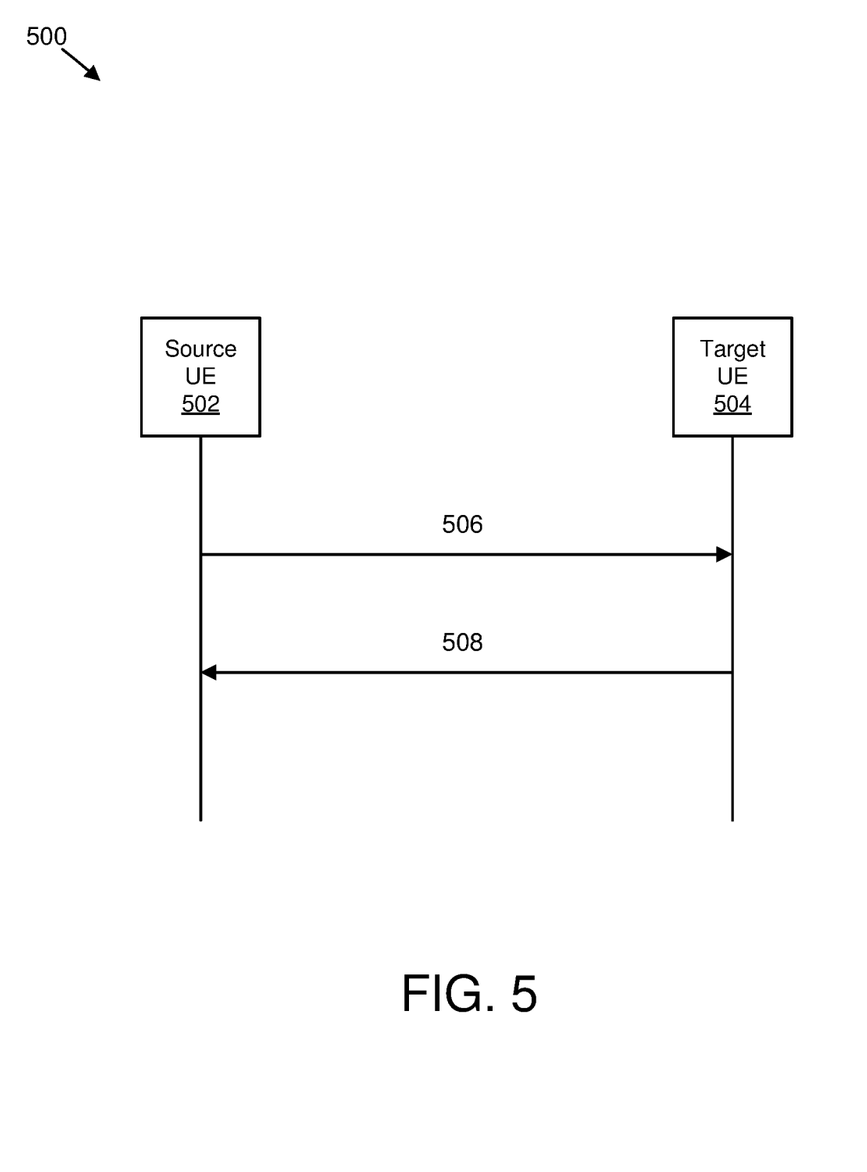
FIG. 5 is a diagram illustrating one embodiment of communications in a system of UEs.

FIG. 5 is a diagram illustrating one embodiment of communications 500 in a system of UEs. The communications 500 include communications between a source UE 502 and a target UE 504. As may be appreciated, communications 500 may include one or more messages.

In a first communication 506 transmitted from the source UE 502 and the target UE 504, the source UE 502 transmits information (e.g., data, RS, and/or signaling addressed to PC5-RNTI or a destination L2-ID, an "are you there" message) to the target UE 504.

In a second communication 508 transmitted from the target UE 504 to the source UE 502, the target UE 504 transmits feedback to the source UE 502 in response to receiving the information from the source UE 502.

In some embodiments, the target UE 504, after receiving one or more "Are you there" messages, may determine if the message is from any known source (e.g., for which an AS context, an RS sequence, and/or PC5-RNTI is saved) and, if the message is from a known source, the target UE 504 may respond by sending in the second communication 508 one or more of: PC5 RRC signaling indicating that the target UE 504 is around, physical layer signaling including HARQ Feedback, a SL RS, a RLM RS, a DMRS sequence, and/or a PSCCH transmission indicating that the target UE 504 is present.

In certain embodiments, if the source UE 502 receives the second communication 508, the source UE 502 may inform an upper layer of a radio link recovery and/or may proceed as if no RLF occurred. In some embodiments, if a started timer expires, the source UE 502 may delete the target UE 504 information context (e.g., including identities, a configuration, capabilities, and so forth).

In various embodiments, the source UE 502 may communicate with the target UE 504 on multiple carrier frequencies (e.g., in a FR1, a FR2, and/or a FR3 region). In such embodiments, the UE pair (e.g., the source UE 502 and the target UE 504) may be configured with alternative beams and/or antenna panels that may be used if there is a BF on a current set of beams. Moreover, in such embodiments, if a BF does take place, the two UEs (or the first one detecting BF) may start using a next configured beam and/or antenna panel in a list configured for this purpose. The list may be configured between the UEs via UE to UE signaling (e.g., based on beam quality reports between the UEs), network configuration, and/or pre-configuration to each of the source UE 502 and the target UE 504 individually. In certain embodiments, instead of a BF, failure of a recovery of the BF may be used as a trigger to start using a next configured beam and/or antenna panel in a list. One or more of the beams in the list may belong to another frequency region (e.g., FR1, FR2, FR3, or any other frequency or frequency region) or frequency band.

In some embodiments, a BFR request may be transmitted in a carrier, antenna panel, frequency, and/or frequency band experiencing a better radio condition for indicating a carrier and/or link ID on which the BF is triggered or occurred.

In certain embodiments, carriers for CA aggregation may be chosen by a source UE such that each candidate carrier is mapped for data transmission from at least one V2X service. In such embodiments, the mapping may be provided by a V2X layer to an AS. Further, in such embodiments, a LCH to carrier restriction may be self-configured based on a V2X service to carrier mapping provided by upper layers. Moreover, in such embodiments, carrier switching (e.g., based on SRS-carrier switching capability of a UE for carriers without Uu PUSCH configured) may be used to switch between carriers for RS transmission if CA is being used in SL. In some embodiments, a RS sequence used on all carriers may remain the same or RS sequences may be independently configured for each carrier (e.g., depending on which sequences are already allocated on that carrier) enabling receivers to link all transmissions from the same source together and accordingly perform link measurement and/or monitoring with a physical UE. In one example, a RS sequence may be the same for all spatial transmit filters or beams. In another example, a RS sequence may be dependent on a spatial transmit filter or beam ID. In various embodiments, SL-RS may be periodically transmitted from different carriers (e.g., with and/or without SL PSSCH and/or PSCCH) for a target UE to measure CSI and/or RSRQ and report back to a source UE and/or to enable the source UE to switch quickly to another carrier if a current carrier link quality is poor to avoid RLF for a SL-UE pair (or between certain L2-IDs for the SL-UE pair). In certain embodiments, if there is SL communication on multiple carriers, then RLF may be declared only if none of the carriers are suitable. In some embodiments, RLM and/or RLF may be performed per carrier.

In various embodiments, if a higher layer enables SL carrier aggregation for a particular service type or provides one or more SL carriers for data transmission, a UE may periodically and/or aperiodically transmit SL RSs in one or more SL carrier. In such embodiments, the UE may receive and store radio link measurements from more than one SL carrier even though it uses only one SL carrier (or a subset of SL carriers) for data transmission and/or reception. This may be done to enable fast switching to another SL carrier during RLF due to an availability of measurement results from more than one SL carrier. In certain embodiments, a UE may report a sidelink radio link measurement performed on one or more sidelink carriers to a gNB for NR mode 1 scheduling. In NR mode 1 scheduling, if the gNB schedules resources for a sidelink transmission, the UE may report a RLF on a particular sidelink carrier to the gNB using uplink L1 and/or L2 signaling that includes a sidelink carrier ID, sidelink destination L1 and/or L2 IDs, and/or link IDs. In such embodiments, the gNB may indicate to the UE to switch to another sidelink carrier using signaling (e.g., a DCI format, DCI format 5A, downlink L1 signaling) in which the sidelink radio link measurement for that carrier is already available. In various embodiments, if both UEs in a communication (e.g., TX or source UEs and RX or target UEs) are connected to the same gNB or the same cell, then RLF reporting to the gNB about the sidelink carrier may be done by any one of the UEs (e.g., the RX UE). In such embodiments, the gNB, after receiving RLF from a UE (e.g., TX UE) and if there are no available measurement result for that sidelink carrier, may explicitly and/or implicitly signal to the UE to switch to mode 2 operations and the UE may use an exceptional resource pool or random resource selection for data transmission for a certain period of time.

In some embodiments, such as in NR mode 2 operation, if a UE (e.g., TX UE) experiences a RLF on one carrier, the UE may switch to another sidelink carrier by signaling the other carrier to the other UE (e.g., RX UE). In such embodiments, after carrier switching, if sensing results are not available for a carrier, then the UE may use an exceptional resource pool or random resource selection for a certain period of time.

In certain embodiments, if a PC5 based V2X application is initiated in a first UE, a physical layer of the first UE may start to periodically transmit its own SL-RS (e.g., a first SL-RS) that is randomly selected, configured by a network entity, or determined based on a pre-defined rule. In one example, the first SL-RS includes one or more sequences for which the one or more sequences are determined based on a first UE's PC5-RNTI. In another example, resource elements for the first SL-RS transmission are determined based on a first UE's PC5-RNTI. In a further example, a number of maximum SL-RS resources (or candidate SL-RS positions) may be configured by a network entity, or pre-defined to be dependent on an operating frequency range, frequency band, and/or subcarrier spacing of SL-RS. In yet another example, a number of SL-RS resources used for actual transmission of the first SL-RS is determined by the first UE. Each of the SL-RS resources may correspond to one spatial channel, spatial direction, or beam direction.

In various embodiments, a second UE receives one or more PC5 RLM measurement objects (or one or more PC5 RLM configurations) and one timer value from a first UE. In such embodiments, a set of L2-ID pairs may be established for V2X applications between the first UE as a source and a second UE as a destination.

In some embodiments, in each PC5 RLM measurement object (or each PC5 RLM configuration), a subset of L2-ID pairs may be configured with a subset of resources of a SL-RS, a first counter, a second counter, a timer, and a pair of BLER threshold for IS and/or OOS indication generation (e.g., Qin/Qout values—such as Qin=2% BLER, Qout=10% BLER). In such embodiments, each of the one or more PC5 RLM measurement objects may be configured with a different pair of BLER thresholds for IS and/or OOS evaluation to satisfy different required link qualities for different V2X applications (or application groups). For example, a set of L2-ID pairs may be partitioned into multiple subsets according to QoS requirements of V2X applications corresponding to the L2-ID pairs.

In certain embodiments, a second UE may perform RLM measurements on a first subset of SL-RS resources of a first PC5 RLM measurement object and a second subset of SL-RS resources of a second PC5 RLM measurement object in which the first and second PC5 RLM measurement objects may be configured by a first UE for RLM measurements at the second UE. In various embodiments, a given L2-ID pair is a logical channel, and different L2-ID pairs (e.g., different logical channels) may share the same SL-RS resource. Thus, in such embodiments, a first subset of SL-RS resources of the first PC5 RLM measurement object and a second subset of SL-RS resources of the second PC5 RLM measurement object may be the same, mutually exclusive, or different with some common SL-RS resources. In some embodiments, a second UE generates and counts an IS or OOS indication for each RLM measurement object based on Qin and/or Qout values of each RLM measurement object. In one implementation, OOS is indicated if link qualities on all SL-RS resources in the first (or second) subset of SL-RS resources are worse than Qout. In another implementation, IS is indicated if a channel quality on any of the SL-RS resources in the first (or second) subset of SL-RS resources is better than Qin. It should be noted that for a given SL-RS resource, link quality assessment (e.g., an estimated BLER) may be done at most once per PC5 RLM measurement period and RLM measurement complexity for multiple PC5 RLM measurement objects may remain similar compared to having only one PC5 RLM measurement object.

In various embodiments, if a first timer of a first PC5 RLM measurement object expires but a second timer of a second PC5 RLM measurement object has not been started or has not expired, a second UE may not start a third timer. Moreover, the second UE may start the third timer in response to the first timer and the second timer expiring.

In certain embodiments, if a first timer expires but a second timer has not been started or has not expired, a second UE may indicate expiration of the first timer to a first UE via one of an L2-ID pair included in a second PC5 RLM measurement object. Furthermore, the second UE may continue to perform PC5 RLM measurements on a first subset of SL-RS resources and count IS indications until a third timer starts, while performing PC5 RLM measurements for the second PC5 measurement object.

In some embodiments, upon receiving an indication of expiration of a first timer from a second UE, a first UE may terminate V2X applications corresponding to a first subset of L2-ID pairs of a first PC5 RLM measurement object but may continue transmitting a first SL-RS on the first subset of SL-RS resources. If the second UE receives IS indications in the first PC5 RLM measurement object before a third timer starts, the second UE may indicate a link recovery for the first subset of L2-ID pairs to the first UE via one of an L2-ID pair included in the second PC5 RLM measurement object.

Figure 6:
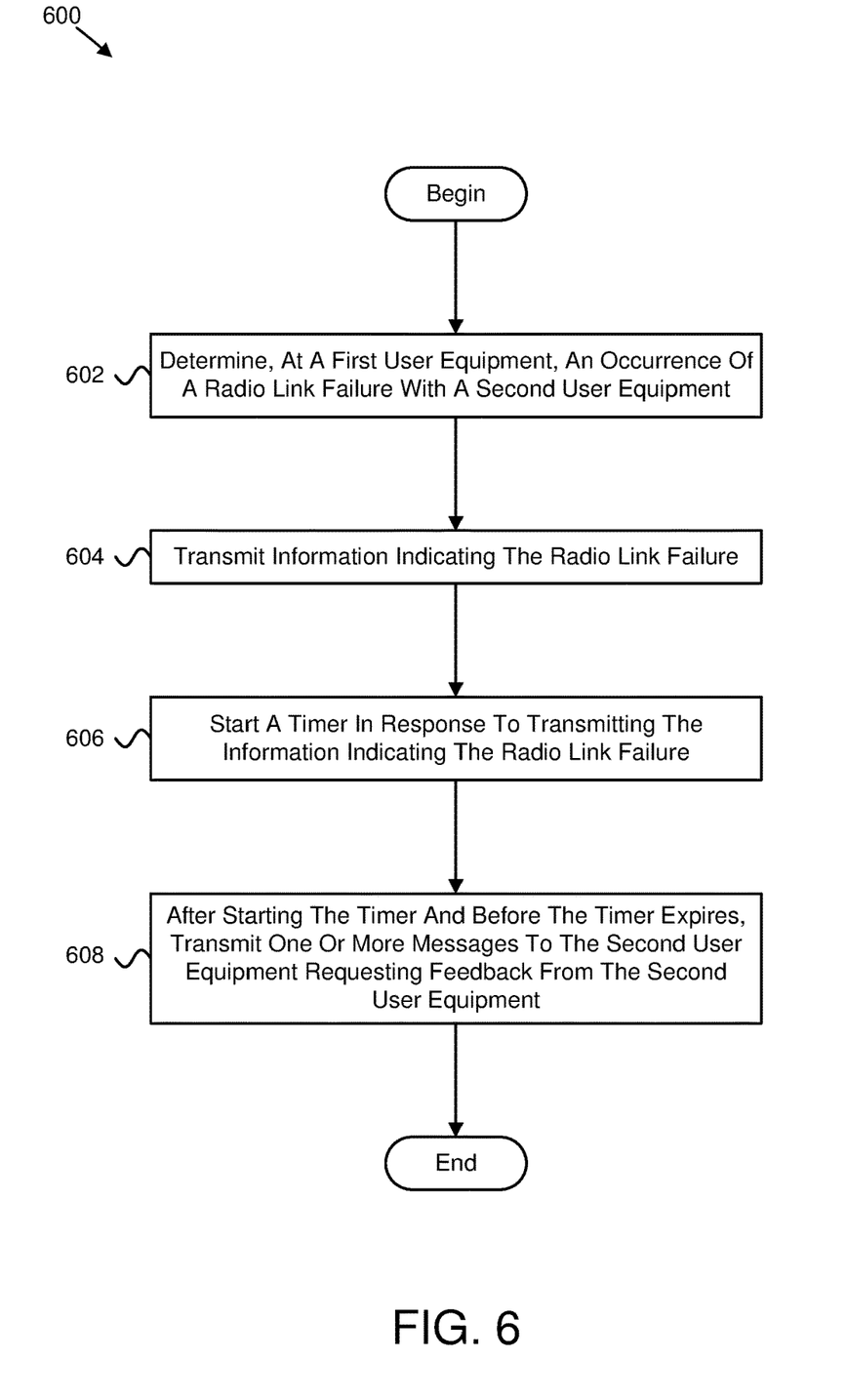
FIG. 6 is a flow chart diagram illustrating one embodiment of a method for radio link failure recovery.

FIG. 6 is a flow chart diagram illustrating one embodiment of a method 600 for radio link failure recovery. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In one embodiment, the method 600 includes determining 602, at a first user equipment, an occurrence of a radio link failure with a second user equipment. In some embodiments, the method 600 includes transmitting 604 information indicating the radio link failure. In various embodiments, the method 600 includes starting 606 a timer in response to transmitting the information indicating the radio link failure. In certain embodiments, the method 600 includes, after starting the timer and before the timer expires, transmitting 608 one or more messages to the second user equipment requesting feedback from the second user equipment.

In certain embodiments, the radio link failure corresponds to a physical user equipment. In some embodiments, the radio link failure corresponds to a layer 2 identifier pair. In various embodiments, the one or more messages comprise data that has not been acknowledged.

In one embodiment, the method 600 further comprises receiving feedback in response to transmitting the one or more messages. In certain embodiments, the method 600 further comprises, in response to not receiving feedback corresponding to the one or more messages, determining a failure to recover the radio link failure. In some embodiments, the first user equipment and the second user equipment are a user equipment pair.

In various embodiments, the first user equipment and the second user equipment are configured with a list of communication paths comprising one or more beams, one or more antenna panels, or a combination thereof. In one embodiment, the method 600 further comprises using a second communication path of the list of communication paths in response to the radio link failure occurring on a first communication path of the list of communication paths. In certain embodiments, the method 600 further comprises transmitting a reference signal sequence to the second user equipment, wherein the second user equipment identifies the first user equipment based on the reference signal sequence.

In some embodiments, the reference signal sequence is selected from a set of reference signal sequences. In various embodiments, the method 600 further comprises transmitting a random number temporary identifier to the second user equipment, wherein the second user equipment identifies the first user equipment based on the random number temporary identifier.

In one embodiment, a method comprises: determining, at a first user equipment, an occurrence of a radio link failure with a second user equipment; transmitting information indicating the radio link failure; starting a timer in response to transmitting the information indicating the radio link failure; and after starting the timer and before the timer expires, transmitting one or more messages to the second user equipment requesting feedback from the second user equipment.

In certain embodiments, the radio link failure corresponds to a physical user equipment.

In some embodiments, the radio link failure corresponds to a layer 2 identifier pair.

In various embodiments, the one or more messages comprise data that has not been acknowledged.

In one embodiment, the method further comprises receiving feedback in response to transmitting the one or more messages.

In certain embodiments, the method further comprises, in response to not receiving feedback corresponding to the one or more messages, determining a failure to recover the radio link failure.

In some embodiments, the first user equipment and the second user equipment are a user equipment pair.

In various embodiments, the first user equipment and the second user equipment are configured with a list of communication paths comprising one or more beams, one or more antenna panels, or a combination thereof.

In one embodiment, the method further comprises using a second communication path of the list of communication paths in response to the radio link failure occurring on a first communication path of the list of communication paths.

In certain embodiments, the method further comprises transmitting a reference signal sequence to the second user equipment, wherein the second user equipment identifies the first user equipment based on the reference signal sequence.

In some embodiments, the reference signal sequence is selected from a set of reference signal sequences.

In various embodiments, the method further comprises transmitting a random number temporary identifier to the second user equipment, wherein the second user equipment identifies the first user equipment based on the random number temporary identifier.

In one embodiment, an apparatus comprises a first user equipment, the apparatus comprising: a processor that determines an occurrence of a radio link failure with a second user equipment; and a transmitter that transmits information indicating the radio link failure, wherein: the processor starts a timer in response to transmitting the information indicating the radio link failure; and the transmitter, after starting the timer and before the timer expires, transmits one or more messages to the second user equipment requesting feedback from the second user equipment.

In certain embodiments, the radio link failure corresponds to a physical user equipment.

In some embodiments, the radio link failure corresponds to a layer 2 identifier pair.

In various embodiments, the one or more messages comprise data that has not been acknowledged.

In one embodiment, the apparatus further comprises a receiver that receives feedback in response to transmitting the one or more messages.

In certain embodiments, in response to not receiving feedback corresponding to the one or more messages, the processor determines a failure to recover the radio link failure.

In some embodiments, the first user equipment and the second user equipment are a user equipment pair.

In various embodiments, the first user equipment and the second user equipment are configured with a list of communication paths comprising one or more beams, one or more antenna panels, or a combination thereof.

In one embodiment, the processor uses a second communication path of the list of communication paths in response to the radio link failure occurring on a first communication path of the list of communication paths.

In certain embodiments, the transmitter transmits a reference signal sequence to the second user equipment, and the second user equipment identifies the first user equipment based on the reference signal sequence.

In some embodiments, the reference signal sequence is selected from a set of reference signal sequences.

In various embodiments, the transmitter transmits a random number temporary identifier to the second user equipment, and the second user equipment identifies the first user equipment based on the random number temporary identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a first user equipment, the method comprising:
   determining, at the first user equipment, an occurrence of a radio link failure with a second user equipment;
   transmitting, from the first user equipment, information indicating the radio link failure with the second user equipment to the second user equipment;
   starting, at the first user equipment, a timer in response to transmitting the information indicating the radio link failure; and
   after starting the timer and before the timer expires, transmitting, from the first user equipment, one or more messages to the second user equipment requesting feedback from the second user equipment to attempt to recover a radio link with the second user equipment.

2. The method of claim 1, wherein the radio link failure corresponds to a physical user equipment.

3. The method of claim 1, wherein the radio link failure corresponds to a layer 2 identifier pair.

4. The method of claim 1, wherein the one or more messages comprise data that has not been acknowledged.

5. The method of claim 1, further comprising receiving feedback in response to transmitting the one or more messages.

6. The method of claim 1, further comprising, in response to not receiving feedback corresponding to the one or more messages, determining a failure to recover the radio link failure.

7. The method of claim 1, wherein the first user equipment and the second user equipment are a user equipment pair.

8. The method of claim 1, wherein the first user equipment and the second user equipment are configured with a list of communication paths comprising one or more beams, one or more antenna panels, or a combination thereof.

9. The method of claim 8, further comprising using a second communication path of the list of communication paths in response to the radio link failure occurring on a first communication path of the list of communication paths.

10. The method of claim 1, further comprising transmitting a reference signal sequence to the second user equipment, wherein the second user equipment identifies the first user equipment based on the reference signal sequence.

11. The method of claim 10, wherein the reference signal sequence is selected from a set of reference signal sequences.

12. The method of claim 1, further comprising transmitting a random number temporary identifier to the second user equipment, wherein the second user equipment identifies the first user equipment based on the random number temporary identifier.

13. An apparatus comprising a first user equipment, the apparatus comprising:
   a processor that determines an occurrence of a radio link failure with a second user equipment; and
   a transmitter that transmits information indicating the radio link failure with the second user equipment to the second user equipment, wherein:
   the processor starts a timer in response to transmitting the information indicating the radio link failure; and
   the transmitter, after starting the timer and before the timer expires, transmits one or more messages to the second user equipment requesting feedback from the second user equipment to attempt to recover a radio link with the second user equipment.

14. The apparatus of claim 13, wherein the radio link failure corresponds to a physical user equipment.

15. The apparatus of claim 13, wherein the radio link failure corresponds to a layer 2 identifier pair.

16. The apparatus of claim 13, wherein the one or more messages comprise data that has not been acknowledged.

17. The apparatus of claim 13, further comprising a receiver that receives feedback in response to transmitting the one or more messages.

18. The apparatus of claim 13, wherein, in response to not receiving feedback corresponding to the one or more messages, the processor determines a failure to recover the radio link failure.

19. The apparatus of claim 13, wherein the first user equipment and the second user equipment are a user equipment pair.

20. The apparatus of claim 13, wherein the first user equipment and the second user equipment are configured with a list of communication paths comprising one or more beams, one or more antenna panels, or a combination thereof.

21. The apparatus of claim 20, wherein the processor uses a second communication path of the list of communication paths in response to the radio link failure occurring on a first communication path of the list of communication paths.

22. The apparatus of claim 13, wherein the transmitter transmits a reference signal sequence to the second user equipment, and the second user equipment identifies the first user equipment based on the reference signal sequence.

23. The apparatus of claim 22, wherein the reference signal sequence is selected from a set of reference signal sequences.

24. The apparatus of claim 13, wherein the transmitter transmits a random number temporary identifier to the second user equipment, and the second user equipment identifies the first user equipment based on the random number temporary identifier.

* * * * *